June 24, 1941.  E. HERZOG  2,246,516
GOVERNING AND SYNCHRONIZING SYSTEM
Filed March 13, 1939  2 Sheets-Sheet 1
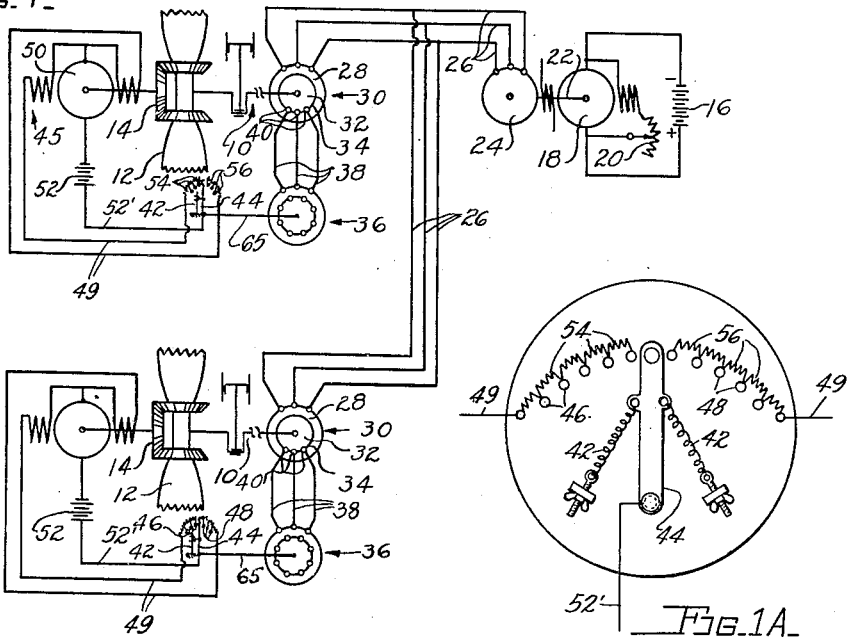
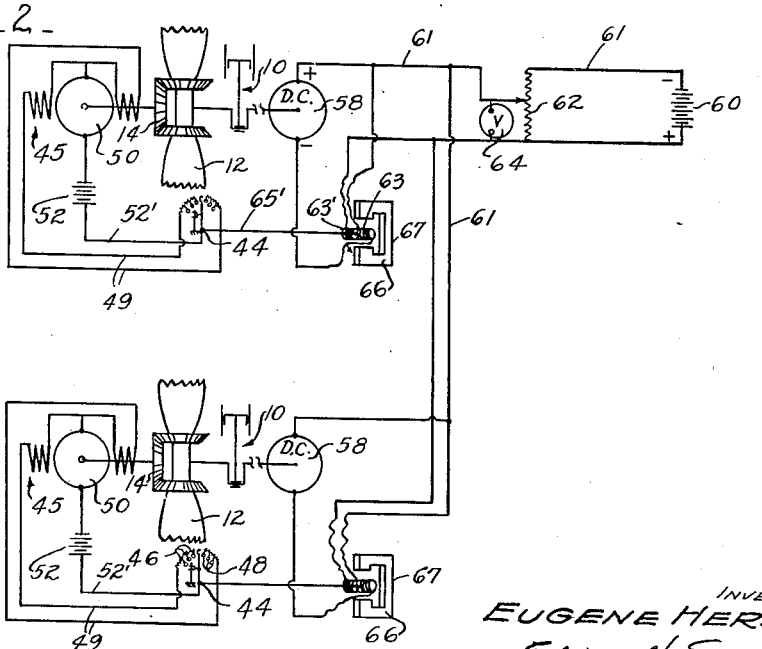
INVENTOR
EUGENE HERZOG
BY Edgar H. Snodgrass
and Wade Kroutz
ATTORNEYS June 24, 1941.  E. HERZOG  2,246,516

GOVERNING AND SYNCHRONIZING SYSTEM

Filed March 13, 1939  2 Sheets-Sheet 2

INVENTOR
EUGENE HERZOG
BY Edgar H. Snodgrass
Wade Krontz
ATTORNEYS

Patented June 24, 1941

2,246,516

UNITED STATES PATENT OFFICE 2,246,516

GOVERNING AND SYNCHRONIZING SYSTEM

Eugene Herzog, Dayton, Ohio

Application March 13, 1939, Serial No. 261,541

7 Claims. (Cl. 60—97)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a governing system which holds the speed of one or more prime movers or motors fixed in relation to certain fixed or adjustable electrical quantities used as standards.

It is an an object of the invention to provide a light weight standard and one of low energy consumption for the speed control of rotating apparatus.

It is a further object of the invention to provide a non-rotating standard for the speed control of rotating apparatus.

It is a still further object to provide a means of speed control which provides greater accuracy as to the speed desired at a lower cost.

It is a still further object to provide a means of speed control for a plurality of rotating equipment whereby the speed of each rotating equipment is held in fixed relation to a speed reference by controlling an electrical effect of each in relation to a standard electrical quantity.

Other objects and advantages will become apparent as the invention is described.

Fig. 1 is a schematic view showing one embodiment of my invention, in which the frequency effect produced by the engine speed is compared to a standard or reference frequency, the difference in frequency between the reference frequency and the engine-produced frequency being utilized to control the speed of the engine;

Fig. 1A is an elevational view showing the details of a control switch employed in the various modifications of my invention;

Figure 3:
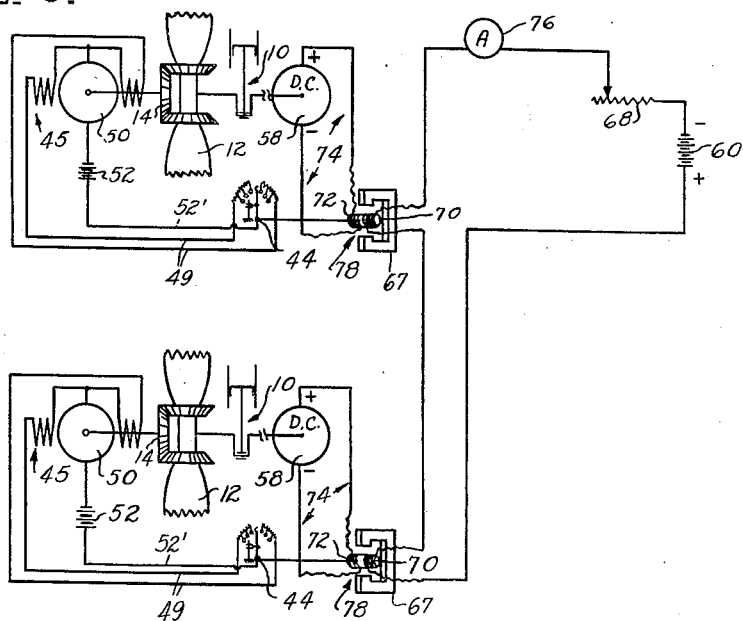

Fig. 2 is a view similar to Fig. 1, in which the voltage difference between a voltage produced in accordance with the speed of the engine and the voltage of a battery or other reference means is utilized to control the speed of the engine; and Fig. 3 is a view similar to Figs. 1 and 2, showing the utilization of current difference effects between a standard or reference current and a current produced in accordance with the speed of the engine for purposes of controlling the speed of the engine.

In the various embodiments illustrated herein similar parts will be designated by the same reference characters.

While the invention is described in particular in its application to the governing and synchronizing of airplane engines it is not restricted to such an application but may be used in the governing and synchronizing of any other kind of prime movers or motors where the speed may be controlled by increasing and decreasing either the power input, such as the engine throttle, or the power output, such as a propeller pitch changing means.

In accordance with one embodiment of my invention the speed of one or more engines is controlled by comparing the electrical frequency effect produced by suitable means directly or indirectly associated with and operating as a function of the speed of said engine or engines respectively, with a standard or reference frequency and utilizing the difference effect, if any, between said produced frequency or frequencies and said standard frequency for controlling suitable variable pitch propeller means associated with said engine or engines and thereby control the speed or speeds thereof. This embodiment of my invention is illustrated in Figure 1, in which I have shown two aircraft engines 10 the output of each of which is governed by varying the pitch of a propeller 12 through suitable propeller pitch changing means 14 of the well-known electric motor type described in Patent No. 1,951,320 granted on March 13, 1934. For obtaining the particular electrical reference quantity, i. e. the reference frequency, current is supplied from a battery 16 to a direct current motor 18 which is designed to run at a constant but adjustable speed. The speed adjustment is obtained by means of a rheostat 20 as is well known in the electrical art. The direct current motor 18 drives mechanically through a shaft 22 an alternating current polyphase generator 24 which in consequence runs at a constant but adjustable speed and its electrical output is at a constant but adjustable reference frequency. This electrical output is impressed by means of conductors 26 on the stator 28 of wound rotor induction motors 30 of the slip ring type the rotors 32 of which are driven by the engines 10 respectively at speeds proportional to the corresponding engine speeds through suitable mechanical connections, such as cam shaft drive (not shown). Under these conditions a voltage will appear at the slip rings 34 of each of the wound rotor induction motors 30 which voltage is proportional in magnitude and frequency to the difference in speed between each of the engines and the master alternator 24 and whose phase rotation respectively is dependent on whether the engine or the rotating magnetic field due to the master alternator has the greater speed.

The electrical output of each of the slip ring induction motors is preferably utilized to actuate a corresponding relay means which in turn controls the pitch varying means of the propeller. As illustrated a three-phase motor 36 is electrically connected by means of conductors 38 and brushes 40 to the slip rings 34, so that the output of the slip rings is impressed thereupon to rotate the same. The rotation of the three-phase motor 36 is restrained by means of one or more springs 42 in such manner as to obtain a rotational deflection which is proportional to the output of the slip rings, the spring or springs 42 serving to restore the switch arm to the neutral position after displacement of said arm in either direction. The shaft 65 of the three-phase motor 36 has mounted thereon, in fixed relation therewith, a contact arm 44 which closes the pitch changing motor's circuit 45 through contact points 46 or 48, that are symmetrically disposed with relation to the arm 44 in the neutral or mid position thereof, i. e. where the speed of the engine and the speed of the master alternator are in synchronism, the details of the switch for controlling the pitch-changing motor being illustrated in Fig. 1A. In this neutral position the contact arm 44 is out of contact with the contacts 46 or 48. These contact points are electrically connected to the reversible electric motor 50 of the pitch changing means in such a manner that the torque of the motor will increase in proportion to the deflection of the arm 44 in either direction. As illustrated motor 50 is of the split field series wound type and is connected with a source of energy 52 in series with either set of resistors 54 or 56 by means of the contact points 46 or 48 respectively and contact arm 44. As the contact arm 44 deflects in one direction or the other making contact with either contacts 46 or 48 the resistance in the motor circuit will be progressively diminished producing a progressively increasing torque in motor 50. It will thus be seen that the torque available for correction will depend on the extent of off speed of each of the engines relative to the master alternator or reference.

The torque motor 36 here simply acts as a relay preserving the proportionality between error and adjustment of speed of the engines and permitting the entire system to be built of light weight because of the small power required to actuate the relay. It will be understood that where weight is not an important factor the output of the slip ring motor 30 may be made large enough to operate directly the conventional speed adjusting device such as the propeller pitch change motor or valve for hydraulic control or the throttle control.

The above system of frequency balancing is a preferred method because of its simplicity and because of the ease with which proportional adjustment is attained but this invention is not to be restricted to the particular means of creating or matching the standard frequency or to the devices illustrated utilizing the frequency difference for speed control as other equivalent devices may be utilized for these purposes.

My invention further contemplates controlling the speed of the engine by comparing the voltage produced by the engine driven generator with a standard reference voltage. This variation is illustrated in Figure 2 wherein each of the engines 10 to be controlled drive a generator 58 that produces a voltage proportional to the engine speed. The electrical circuit for accomplishing the control for each engine consists of the source 60, the potentiometer 62, the voltmeter 64, the generator 58, and the voltage differential relay 66. The negative side of the battery 60 is connected to the positive side of the generator 58 through a portion of the resistance winding of the potentiometer 62 by a conductor 61. The negative side of the generator 58 is connected through the relay 66, one coil 63 of the relay being connected across the generator 58, and the other, 63[1], being connected across the battery 60, both of the coils 63 being connected in parallel with the battery. All the magneto motive force developed in one of the coils of the rotor of differential relay 66—which includes the polarizing magnet 67—by the generator 58, is opposed by the magneto motive force developed in the other rotor coil of the differential relay 66 by the battery 60. The voltmeter 64 serves to indicate the desired setting of the potentiometer 62. As long as the generator 58 is driven at the desired speed, the rotor of the differential relay 66 will remain in a neutral position at right angles to the plane of the field of the polarizing magnet used in differential relays of the type described. The source 60, while illustrated as a battery, may be a generator that constitutes the source of the standard or reference voltage. This reference voltage is adjusted to the desired value by a potentiometer 62 to allow for any variations of the source or to obtain an adjustment for the speed desired. The particular speed to which the source is adjusted is indicated by the voltmeter 64 which may be calibrated in terms of engine speed to aid the pilot or operator. Generator 58 produces a voltage proportional to the engine speed. A suitable voltage differential relay 66 of well-known construction such as a d'Arsonval type instrument is commonly coupled to the output of the generator 58 and the reference source 60, the movable portion of this instrument is connected by a shaft 65 to the contact arm 44 that is actuated in one direction or the other by a difference in voltage between the voltage produced by the generator and that produced by the source of standard voltage, the sign of the voltage difference depending on whether the voltage produced by the generator is greater or less than that of the source. Movement of the contact arm 44 in the clockwise or counterclockwise direction will close the circuit 45 through contacts 46 or 48 respectively, causing the motor 50 to operate in one direction or the other and with a torque corresponding to the extent of variation of resistance of the circuit due to the deflection of the contact arm. The servomotor 50 is controlled, by means of the relay 66 through the arm 44 and contact points 46, 48 in the manner described above in connection with Fig. 1.

Fig. 3 illustrates a still further variation of my invention in which provision is made for controlling speed by means of comparing current quantities. The engines 10 whose speed is to be controlled respectively drive through suitable mechanical connection generators 58. Control is obtained by comparing the current in a reference circuit consisting of a source 60, an adjustable rheostat 68, an ammeter 76, and a pair of coils 70 connected in series, with the variable currents in circuits 74, each consisting of a generator 58 and a coil 72. The source 60 which may be a battery or generator supplies the reference current which is adjusted by means of the rheostat 68 to a standard value. The rheostat 68 provides adjustment for variations in the source and for variations in the speed desired. The standard current and in consequence the standard speed is indicated by the ammeter 76 which is calibrated in terms of speed to indicate the set speed to the pilot or operator. Each generator circuit has a resistance such that for all reference current settings the generator 58 will produce current values that are proportional to the reference current and as illustrated the controlled current for all different settings will be equal to the reference current when the speed of the engine is at the set value. The controlled current and the reference current are compared by a current differential relay 78, such as a d'Arsonval type instrument, which includes the two windings 70 and 72. A contact arm 44 is actuated by the current differential relay due to a current difference between the reference current and the controlled current, the magnitude of its deflection depending on the extent of the current difference, the direction of its deflection depending upon whether the current produced by the generator is greater or less than that produced by the reference source. Deflection of the contact arm in the clockwise direction will close the motor circuit 45 causing the motor 50 to operate in one direction and deflection of the contact arm in the counterclockwise direction will cause rotation in the opposite direction, the torque of the motor corresponding to the extent of the deflection of the contact arm.

In the various embodiments of my invention the speed is controlled by means of differences of frequency, voltage or current. The control in each case may be accomplished either by producing a mechanical effect such as torque proportional to such electrical quantities and then actuating the speed control by the torque difference either directly or through intermediate relays and servo mechanisms. It will be understood however that the standard and controlled quantities may be compared directly, their difference produced and then converted into mechanical control effects. Whether one method or the other is used will depend on various factors. Direct comparison is more sensitive but may produce undesirable mutual effects if two or more engines are controlled at the same time; comparison after conversion to mechanical effects usually permits a better control of these mutual effects between engines.

Where two or more engines are controlled by electrical means electrically coupled to a reference electrical circuit, the change in the speed of one of the engines will produce a mutual effect in the electrical circuits associated with the other engines. This mutual interference is a function of the electrical coupling between the respective circuits and with the system illustrated in Fig. 3, where the circuits are coupled inductively and where direct currents are compared, then the mutual effects will be restricted to transient conditions and the mutual interference will be largely eliminated or reduced to the minimum. The circuits illustrated above can be designed to provide a minimum-optimum coupling, i. e. the coupling should be such as to allow the minimum transfer of energy from one circuit to the other especially from one controlled circuit to another controlled circuit. The practical limitation on the increasing looseness of coupling is the decreasing sensitivity of the control beyond a certain point. The balance between control of mutual effects and sensitivity has to be adapted for each particular use.

The advantages set forth for loose coupling relation between the controlled and reference circuits where current quantities are utilized as a reference medium is equally advantageous where the reference medium is an electrical frequency or an electrical voltage.

It is to be understood that the above described embodiments of my invention are for the purpose of illustration only, and various changes may be made therein without departing from the spirit or scope of the invention.

What I claim as new and desire to secure by Letters Patent is:

1. A synchronizing system for a plurality of prime movers comprising means for producing an electrical reference quantity, means associated with and actuated by each of said prime movers for producing variable electrical quantities similar to and comparable with said reference quantity and proportional in value to the speeds of said prime movers, respectively, means associated with said reference quantity producing means and each of said variable quantity producing means for producing a corresponding number of difference effects, and separate means responsive to said difference effects for controlling the speeds of said prime movers, said separate means including control elements for varying the respective speeds of said prime movers, electric servomotors operatively associated with said control elements for positioning the same to control the prime mover speeds, and means responsive to said difference effects for controlling the supply of energy to said servomotors so that the respective speeds thereof are proportional to the instantaneous magnitudes of said difference effects respectively.

2. An electrical control system for controlling the speed of a prime mover comprising an electrical circuit for producing an electrical reference quantity, an electric generating circuit associated with said prime mover for producing a variable electrical quantity similar to and comparable with said reference quantity and proportional to the speed of said prime mover, said circuits being loosely coupled and having means associated with said coupling for producing difference quantity effects, and means for utilizing said difference effects to control the speed of said prime mover and in proportion to the instantaneous magnitude of said difference effects.

3. An electrical control system for regulating the speed of a prime mover comprising means for producing an electrical reference voltage of predetermined value, prime mover actuated means for producing a variable electrical voltage comparable with said reference voltage and proportional in value to the speed of said prime mover, means for producing a difference effect between said reference voltage and said variable voltage, and means responsive to said difference effect for varying the speed of said prime mover in proportion to the instantaneous magnitude of said difference effect.

4. A synchronizing system for a plurality of prime movers comprising means for producing an electrical reference voltage, means associated with and actuated by each of said prime movers for producing variable electrical voltages comparable with said reference voltage and proportional in value to the speeds of said prime movers, respectively, means associated with said reference voltage producing means and each of said variable voltage producing means for producing a corresponding number of difference effects, and separate means responsive to said difference effects for controlling the speeds of said prime movers in proportion to the instantaneous magnitudes of said difference effects respectively.

5. An electrical control system for regulating the speed of a prime mover comprising means for producing an electrical reference current of adjusted predetermined value, prime mover actuated means for producing a variable electrical current comparable with said reference current and proportional in value to the speed of said prime mover, means for producing a difference effect between said reference current and said variable current, and means responsive to said difference effect for varying the speed of said prime mover in proportion to the instantaneous magnitude of said difference effect.

6. An synchronizing system for a plurality of prime movers comprising means for producing an electrical reference current, means associated with and actuated by each of said prime movers for producing variable electrical currents comparable with said reference current and proportional in value to the speeds of said prime movers, respectively, means associated with said reference current producing means and each of said variable current producing means for producing a corresponding number of difference effects, and separate means responsive to said difference effects for controlling the speeds of said prime movers in proportion to the instantaneous magnitudes of said difference effects respectively.

7. An electrical speed control system comprising two electrical circuits, one of said circuits including in series relation a battery constituting a source of current supply, a rheostat for adjusting said current supply to obtain a reference current, an ammeter calibrated in terms of speed for indicating the reference current value, and a coil, the other said circuits including in series relation a prime mover driven generator and a coil, said circuits being so constructed and arranged that the currents flow in opposite senses therethrough to thereby produce opposite magnetic fields, and means associated with said coils and movable in opposite directions in response to the differences in said magnetic effects, and means controlled by said differential responsive means for regulating the movement of the prime mover control part in proportion to the instantaneous deflection of the differential responsive means.

EUGENE HERZOG.